(12) United States Patent
Kondoh et al.

(10) Patent No.: US 11,482,029 B2
(45) Date of Patent: Oct. 25, 2022

(54) IMAGE PROCESSING DEVICE, IMAGE PROCESSING METHOD, AND RECORDING MEDIUM

(71) Applicant: NEC Corporation, Tokyo (JP)

(72) Inventors: Katsuhiko Kondoh, Tokyo (JP); Yasushi Hidaka, Tokyo (JP); Satoshi Segawa, Tokyo (JP); Yuichi Nakatani, Tokyo (JP); Michiru Sugimoto, Tokyo (JP); Junya Akiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 16/976,644

(22) PCT Filed: Mar. 8, 2019

(86) PCT No.: PCT/JP2019/009350
§ 371 (c)(1),
(2) Date: Aug. 28, 2020

(87) PCT Pub. No.: WO2019/193923
PCT Pub. Date: Oct. 10, 2019

(65) Prior Publication Data
US 2021/0012104 A1 Jan. 14, 2021

(30) Foreign Application Priority Data
Apr. 2, 2018 (JP) .............................. JP2018-071144

(51) Int. Cl.
G06V 30/414 (2022.01)
G06V 10/22 (2022.01)
G06V 30/413 (2022.01)

(52) U.S. Cl.
CPC .......... G06V 30/414 (2022.01); G06V 10/235 (2022.01); G06V 30/413 (2022.01)

(58) Field of Classification Search
CPC .... G06V 30/10; G06V 30/413; G06V 30/414; G06V 10/235
See application file for complete search history.

(56) References Cited

U.S. PATENT DOCUMENTS 5,703,962 A * 12/1997 Niki ..................... G06V 10/987
382/173
10,108,856 B2 * 10/2018 Kalyuzhny .......... G06V 30/412
(Continued)

FOREIGN PATENT DOCUMENTS

EP 0407935 A2 1/1991
JP 11-120293 A 4/1999
(Continued)

OTHER PUBLICATIONS

Extended European Search Report for EP Application No. EP19781366.0 dated Apr. 23, 2021.
(Continued)

Primary Examiner — Daniel G Mariam
(74) Attorney, Agent, or Firm — Sughrue Mion, PLLC

(57) ABSTRACT

An image processing device includes: an identifying unit that identifies a plurality of character strings that are candidates for a recording character string among a plurality of character strings acquired by recognizing characters included in a document image; an output unit that outputs a checking screen that represents positions of the plurality of character strings; and a feature quantity extracting unit that extracts a feature quantity of a character string corresponding to a position identified by a user on the checking screen as a feature quantity of the recording character string.

6 Claims, 10 Drawing Sheets

(56) References Cited

U.S. PATENT DOCUMENTS

2009/0125509 A1* 5/2009 Takebe ................ G06V 10/235
707/999.005
2017/0330030 A1 11/2017 Kalyuzhny et al.

FOREIGN PATENT DOCUMENTS

| JP | 2005-275849 A | 10/2005 |
| JP | 2007-052808 A | 3/2007 |
| JP | 2009-122722 A | 6/2009 |
| JP | 2015-215878 A | 12/2015 |

OTHER PUBLICATIONS

International Search Report for PCT/JP2019/009350 dated May 28, 2019 (PCT/ISA/210).
Communication dated Sep. 23, 2020 for Japan Application No. 2018-071144.

* cited by examiner

FIG. 5

<RECORDING TABLE>

| SLIP ID | IMAGE DATA | RECORDING CHARACTER STRING 1 | RECORDING CHARACTER STRING 2 | RECORDING CHARACTER STRING 3 | RECORDING CHARACTER STRING 4 | ⋮ |
|---|---|---|---|---|---|---|
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

FIG. 7

ACCEPTANCE CERTIFICATE

PAGE 001/001
DEC. 22, 2016

TO ＡＡＡ CORP. LTD
DEVELOPMENT BUSINESS DEPARTMENT
SECOND SECTION　DEPARTMENT CHIEF　YAMADA TARO
〒123-4567 OSU, SHIBUYA-KU, TOKYO
FOUR SEASON BUILDING 5F
(03)1234-5688

STATEMENT OF DELIVERY NO.　473029369

¥ 196,592.-

ABCDEFGH
ORDER NUMBER : AB02512216

(RECEIVED ORDER NO. 361-00020  GSD729)
(3610020)

USE DESTINATION　　: ＡＡＡ(FOR INTERNAL FACILITY)
INSTALLATION PLACE: SHIBUYA-KU, TOKYO

| ORDER NUMBER ITEM NUMBER | PRODUCT NAME / MODEL NUMBER | | QUANTITY | QUANTITY UNIT PRICE | TOTAL PRICE |
|---|---|---|---|---|---|
| AB02512216 0001 | JQ6E-4LV-C2 | A20003-57026 | UNIT | [1] 18,500 | 18,500 |
| AB02512216 0002 | JQGE-STUD-UNIT | A20003-46405 | UNIT | [1] 2,500 | 2,500 |
| AB02512216 0003 | JQGE-CCPU-A1 | A20003-46055 | UNIT | [1] 40,000 | 40,000 |
| AB02512216 0004 | JO6F-2BR-A2 | A20003-46215 | UNIT | [1] 47,000 | 47,000 |
| AB02512216 0005 | IEZ-2BC-2D (WH) | A20003-61555 | UNIT | [1] 22,180 | 22,180 |
| AB02512216 0006 | AC-VO UNIT | A20003-53275 | UNIT | [1] 1,850 | 1,850 |
| AB02512216 0007 | JQ6E-PDV01B-1B | A20003-45360 | UNIT | [1] 50,000 | 50,000 |
| | SUB-TOTAL | | | | 182,030 |
| | CONSUMPTION TAX AND LOCAL CONSUMPTION TAX | | | | 14,562 |
| | BLANK BELOW | | | | |
| | | | | | |
| | | | | | |
| | | | | | |
| | | | | | |
| | TOTAL | | | | 196,592 |

INSPECTED AS ABOVE
　　DATA OF ACCEPTANCE DEC. 22, 2016
　　YOUR COMPANY NAME
　　　　〇〇 CORP. LTD.
　　(DEPARTMENT NAME)
　　　　SALES DEVELOPMENT DEPARTMENT
　　(DEPARTMENT NAME)
　　　　PROCUREMENT DEPARTMENT

YOUR COMPANY SIGNATURE

[SAMPLE
〇〇 OVERSEA
DEVELOPMENT
NIN SHIN
GO GROUP]

003
P-300

IMAGE PROCESSING DEVICE, IMAGE PROCESSING METHOD, AND RECORDING MEDIUM

CROSS REFERENCE TO RELATED APPLICATIONS

This application is a National Stage of International Application No. PCT/JP2019/009350 filed Mar. 8, 2019, claiming priority based on Japanese Patent Application No. 2018-071144, filed Apr. 2, 2018, the disclosures of which are incorporated herein in their entirety.

TECHNICAL FIELD

The present invention relates to an image processing device, an image processing method, and a recording medium.

BACKGROUND ART

Regarding checking and correction of data, in Patent Document 1, it has been described that a data structure of a table and the like in a slip is defined, and data input items are displayed in a correction window for supporting an operation of correcting slip data.

In addition, regarding analyses of formats of documents, in Patent Document 2, it has been described that degrees of similarity with a plurality of models in the length, the position, and the like of a ruled line are calculated, and a model having a highest degree of similarity is selected for identifying a form of a table included in an input image.

PRIOR ART DOCUMENTS

Patent Documents

[Patent Document 1]
Japanese Unexamined Patent Application, First Publication No. 2009-122722
[Patent Document 2]
Japanese Unexamined Patent Application, First Publication No. 2007-052808

SUMMARY OF THE INVENTION

Problem to be Solved by the Invention

As one of situations in which checking and correcting of data are performed, there is a scene on which checking and correcting of results of character recognition are performed. In such a scene, it is preferable that an operation of checking and correcting can be supported even in a case in which a format of a character recognition target is not known in advance, and the format is not limited to the format of a table form.

An example object of the present invention is to provide an image processing device, an image processing method, and a recording medium capable of solving the problems described above.

Means for Solving the Problem

According to a first example aspect of the present invention, an image processing device includes: an identifying unit that identifies a plurality of character strings that are candidates for a recording character string among a plurality of character strings acquired by recognizing characters included in a document image; an output unit that outputs a checking screen that represents positions of the plurality of character strings; and a feature quantity extracting unit that extracts a feature quantity of a character string corresponding to a position identified by a user on the checking screen as a feature quantity of the recording character string.

According to a second example aspect of the present invention, an image processing method includes: identifying a plurality of character strings that are candidates for a recording character string among a plurality of character strings acquired by recognizing characters included in a document image; outputting a checking screen that represents positions of the plurality of character strings; and extracting a feature quantity of a character string corresponding to a position identified by a user on the checking screen as a feature quantity of the recording character string.

According to a third example aspect of the present invention, a recording medium storing a program causing a computer to execute: identifying a plurality of character strings that are candidates for a recording character string among a plurality of character strings acquired by recognizing characters included in a document image; outputting a checking screen that represents positions of the plurality of character strings; and extracting a feature quantity of a character string corresponding to a position identified by a user on the checking screen as a feature quantity of the recording character string.

Effect of the Invention

The present invention can support an operator, who checks and corrects a result of character recognition, performing an operation of checking and correcting even in a case in which a format, which is a character recognition target, is not known in advance, and the format is not limited to the format of a table form.

BRIEF DESCRIPTION OF THE DRAWINGS

FIG. 5 is a diagram illustrating an overview of a recording table stored in a database according to the first example embodiment.

FIG. 7 is a diagram illustrating an example of an image in which a range of each candidate for a recording character string is represented using a frame in the first example embodiment.

EXAMPLE EMBODIMENTS FOR CARRYING OUT THE INVENTION

Hereinafter, although example embodiments of the present invention will be described, the following example embodiments do not limit the invention according to the claims. In addition, all the combinations of features described in the example embodiments may be not essential for solving means of the invention.

Figure 1:
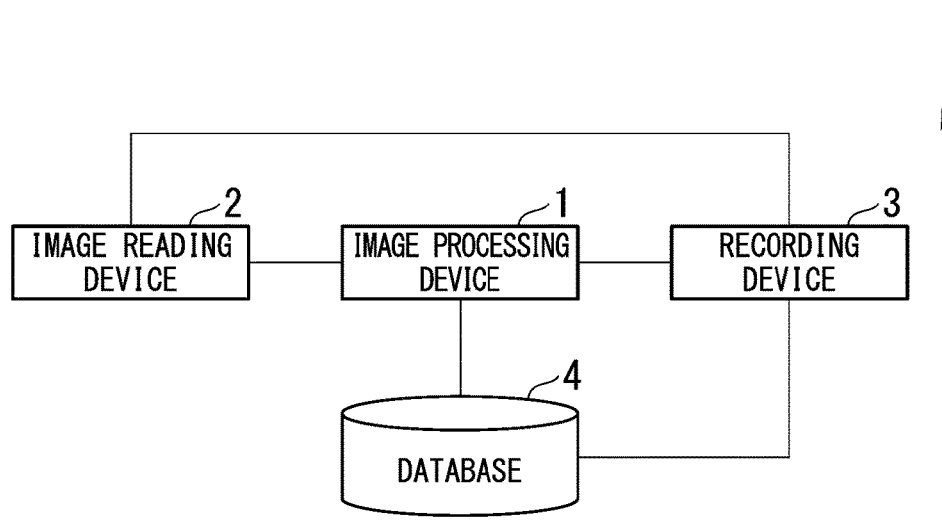
FIG. 1 is a diagram illustrating an example of the device configuration of an image processing system including an image processing device according to an example embodiment.

FIG. 1 is a diagram illustrating an example of the device configuration of an image processing system 100 including an image processing device 1 according to an example embodiment.

In the configuration illustrated in FIG. 1, the image processing system 100 is composed of an image processing device 1, an image reading device 2, a recording device 3, and a database 4.

The image processing device 1 is connected to the image reading device 2 using a communication cable. The image reading device 2 optically acquires image data such as a document slip or the like and outputs it to the image processing device 1. The image processing device 1 performs an OCR process for the image data of the document slip, thereby achieving character recognition. The image processing device 1 outputs a result of the character recognition to the recording device 3, and the recording device 3 records the result of the character recognition in the database. A document targeted by the image processing device 1 is not limited to that of a specific type. Various documents for which the OCR process can be performed can be set as a processing target of the image processing device 1.

The database 4 is connected to the image processing device 1 and the recording device 3. The database 4 stores a correspondence relation between image data of a plurality of document slips registered in the past using the recording device 3 and a recording character string representing a character string that is a recording target among character strings included in the image data. A character string represented by the recording character string is an important character string to be recorded and stored in the database 4 among character strings written in document slips. An operator using the image processing system 100 registers image data of a plurality of document slips registered in the past and recording character strings among character strings included in the image data in the database 4 in advance using the recording device 3.

The operator may be referred to as a user of the image processing device 1 or simply referred to as a user.

In the database 4, sufficient correspondence relations between image data of many document slips and information of recording character strings representing character strings that are recording targets in information of character strings included in the image data are recorded. In such a state, the image processing device 1 performs a process.

Figure 2:
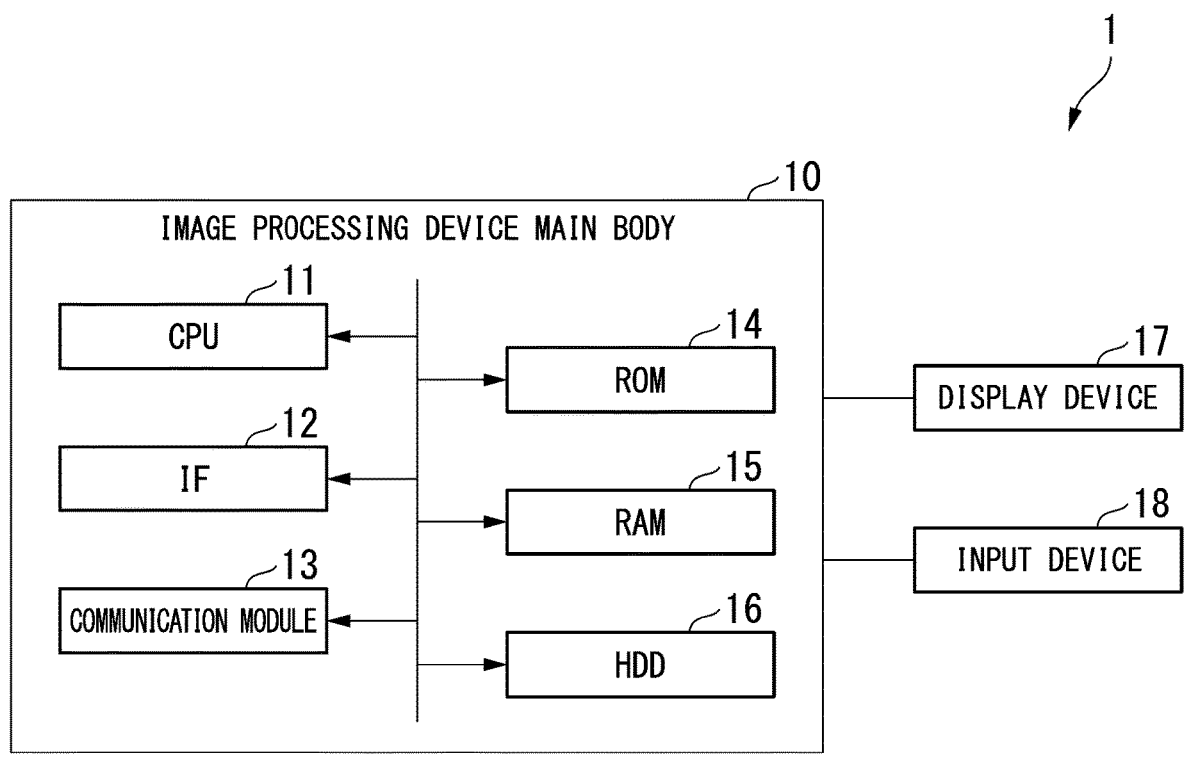
FIG. 2 is a diagram illustrating an example of the hardware configuration of the image processing device according to the example embodiment.

FIG. 2 is a diagram illustrating an example of the hardware configuration of the image processing device 1.

In the configuration illustrated in FIG. 2, the image processing device 1 includes an image processing device main body 10, a display device 17, and an input device 18.

The image processing device main body 10 is a computer including components such as a CPU (Central Processing Unit) 11, an IF (Interface) 12, a communication module 13, a ROM (Read Only Memory) 14, a RAM (Random Access Memory) 15, an HDD (Hard Disk Drive) 16, and the like. The communication module 13 may have a function for performing wired communication with the image reading device 2, the recording device 3, and the database 4, a function for performing wireless communication therewith, or those two functions.

The display device 17, for example, includes a display screen such as a liquid crystal panel, an LED (Light Emitting Diode) panel, or the like.

The input device 18 is a device operated by a user such as, for example, a keyboard, a mouse, or a touch sensor that is disposed in a display screen of the display device 17 and configures a touch panel or a combination thereof or the like.

<First Example Embodiment>

Figure 3:
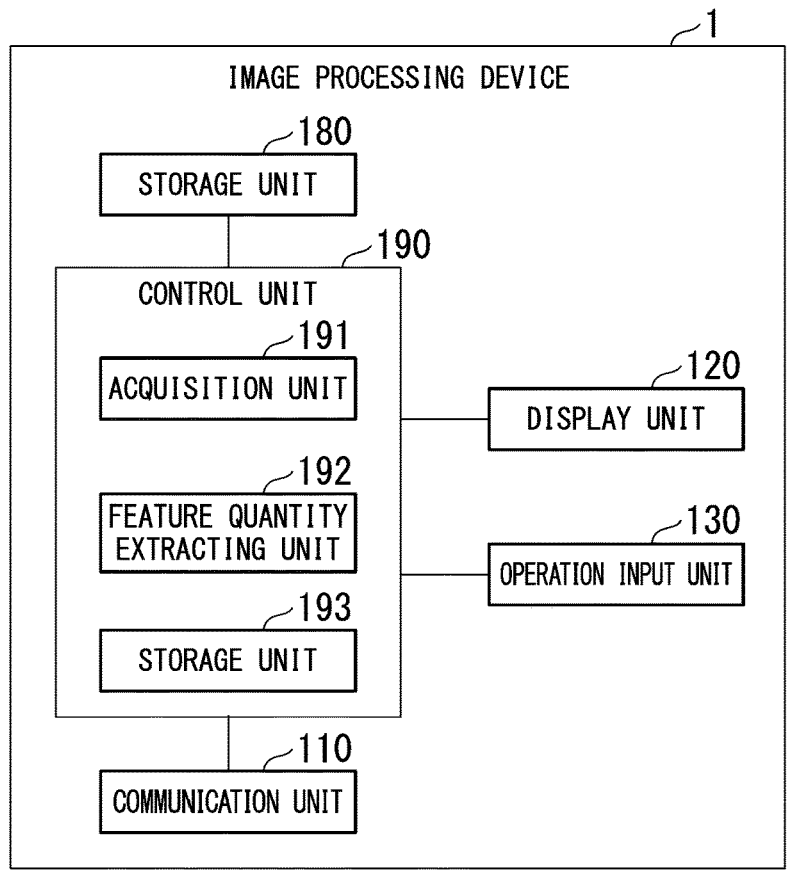
FIG. 3 is a schematic block diagram illustrating the functional configuration of an image processing device according to a first example embodiment.

FIG. 3 is a schematic block diagram illustrating the functional configuration of an image processing device 1 according to the first example embodiment.

A communication unit 110 is configured using the communication module in FIG. 2 and communicates with the other devices. Particularly, the communication unit 110 communicates with the image reading device 2, the recording device 3, and the database 4.

A display unit 120 is configured using the display device 17 in FIG. 2 and displays various images.

Particularly, the display unit 120 corresponds to an example of a checking screen output unit (output unit). In a case in which a feature quantity extracting unit 192 identifies a plurality of candidates for a recording character string in an image of a document slip, the display unit 120 outputs a checking screen that represents positions of the plurality of candidates. The display unit 120 outputs a checking screen that represents the positions of a plurality of candidates in a display identifying character strings on a document image. When an operator selects one of candidates for a recording character string by referring to a checking screen, the feature quantity extracting unit 192 extracts a feature quantity of the selected character string in the image of the document slip. The extraction of a feature quantity will be also referred to as generation of a feature quantity. The extraction of a feature quantity of a character string is to change a feature of the character string into a feature quantity (in other words, to represent a feature using a numerical value). This feature quantity is used for extracting a recording character string from an image of a new document slip.

Here, a method of outputting a checking screen by the checking screen output unit is not limited to the method of displaying a screen. For example, the communication unit 110 may function as a checking screen output unit and may transmit image data of a checking screen to another device and cause the device to display the checking screen.

An operation input unit 130 is configured using the input device in FIG. 2 and accepts a user's operation.

A storage unit 180 is configured using the ROM 14, the RAM 15, and the HDD 16 in FIG. 2 and stores various types of data.

A control unit 190 is configured by the CPU 11 in FIG. 2 reading a program from the storage unit 180 (the ROM 14, the RAM 15, and the HDD 16 in FIG. 2) and executing the program. The control unit 190 executes various processes by controlling each unit of the image processing device 1.

An acquisition unit 191 acquires image data of a document slip.

The feature quantity extracting unit 192 extracts a first feature quantity representing a feature of a recording character string included in image data of a document slip for each piece of image data of document slips on the basis of a result of the process of recognizing image data of a plurality of the document slips.

Particularly, the feature quantity extracting unit 192 identifies a recording character string included in a document image for which a character recognition process has been processed and extracts a first feature quantity of the identified recording character string in the document image. More specifically, the feature quantity extracting unit 192 corresponds to an example of a recording character string identifying unit (an identification unit). The feature quantity extracting unit 192 identifies a character string designated as a recording character string among character strings acquired as a result of character recognition of a document image that is a processing target. In a case in which a plurality of candidates for a recording character string are identified, the feature quantity extracting unit 192 causes the display unit 120 to output a checking screen and extracts a feature quantity of a recording character string at a position identified by a user on the checking screen. Particularly, the feature quantity extracting unit 192 extracts a feature quantity using a character string identified in accordance with a user operation on a document image for which display for identifying a character string has been performed as a recording character string.

The identifying of a recording character string described here is determining one of character strings of a document slip as one recording character string.

The recording unit 193 extracts a recording character string in information of character strings read from image data of a new document slip using feature quantities of character strings of the image data of the new document slip and records it. Particularly, the recording unit 193 corresponds to an example of a recording character string extracting unit (a character string extracting unit). The recording unit 193 extracts a recording character string from a result of character recognition of a new document image using feature quantities of recording character strings extracted by the feature quantity extracting unit 192.

In accordance with such a process, the image processing device 1 reduces effort for recording character string information, included in the image data of a new document slip, to be recorded.

Figure 4:
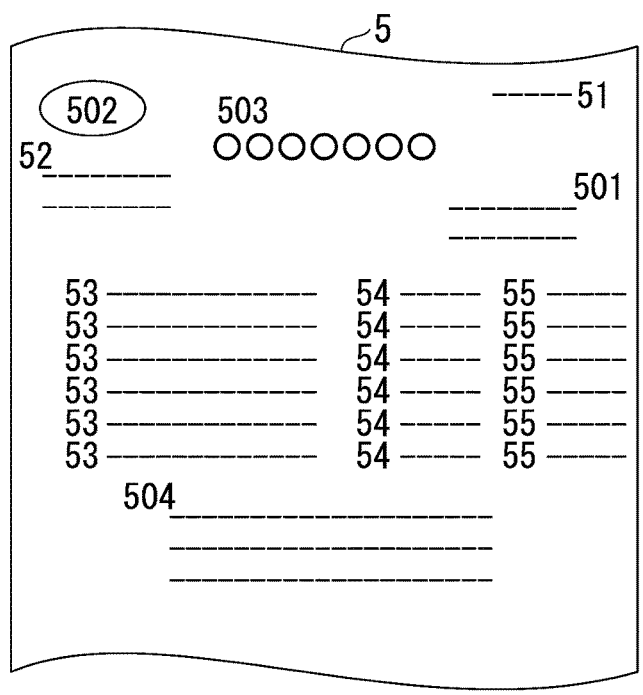
FIG. 4 is a diagram illustrating an example of a document slip.

FIG. 4 is a diagram illustrating an example of a document slip.

As illustrated in this figure, in a document slip, a mark of a company that has generated the document, a generation date, a generating member of staff, and document details are written in a format that is unique to the document slip. For example, when the document slip is an order slip, document details include one or a plurality of sets of information of an ordered product name and the number of ordered products thereof, and the like. On the basis of one document slip, an operator records a specific character string to be recorded (recording character string) among character strings written in the document slip in the database 4 using the recording device 3. More specifically, an operator inputs a recording character string to be recorded in the database 4 by the recording device 3 while viewing a document slip. In addition, the operator causes the image reading device 2 to read image data of the document slip. The document slip is read by the image reading device 2 on the basis of an operator's operation and is output to the image processing device 1. Then, on the basis of an operator's operation and the control of the image processing device 1, the recording device 3 records image data for one document slip and a recording character string among character strings written in the document slip in the database 4 in association with each other. In the example in FIG. 4, a date 51, an ordering destination 52, a product name 53, a quantity 54, and the amount of money 55 are recording character strings. In the document slip 5, other information such as a non-recording character string that is not recorded by the operator and the like are printed. For example, the information is a name 501 of an ordering person who has issued the document slip, an emblem image 502 of the ordering person, a title 503 of the document slip, a greeting phrase 504, and the like.

FIG. 5 is a diagram illustrating an overview of a recording table stored in a database.

As illustrated in FIG. 5, the database 4 stores image data for a document slip and a recording character string among character strings written in the document slip in the recording table in association with each other.

Figure 6:
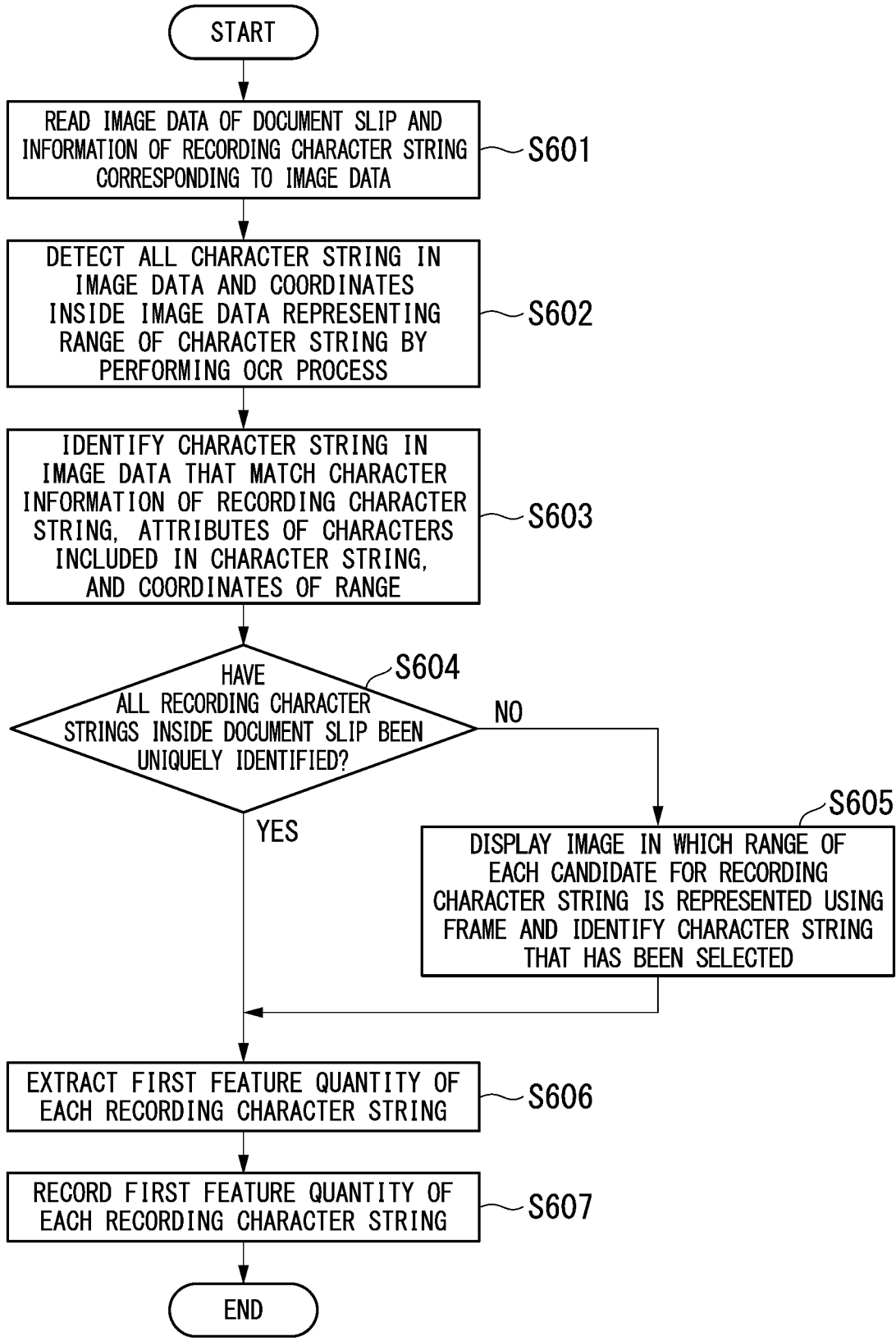
FIG. 6 is a first diagram illustrating the processing flow of the image processing device according to the first example embodiment.

FIG. 6 is a first diagram illustrating the processing flow of the image processing device according to the first example embodiment. FIG. 6 illustrates an example of a processing procedure in which the image processing device 1 extracts a first feature quantity.

Next, the processing flow of the image processing device 1 will be described in order.

First, in the database 4, combinations of image data for a certain document slip and a recording character string described in the document slip corresponding to a plurality of document slips having the same format are recorded. For example, recording character string information (information representing a recording character string) having a format of the document slip 5 illustrated in FIG. 4 corresponding to a plurality of document slips are recorded.

As such combinations of image data and information of a recording character string, for example, image data and recording character string information of document slips handled in past operations may be used. In a case in which image data and recording character string information of a required amount can be secured from past operations, image data and recording character string information do not need to be additionally prepared for causing the image processing device to acquire a first feature quantity.

In such a state, an operator starts the operation of the image processing device 1 and instructs the image processing device 1 to start the process.

The acquisition unit 191 of the image processing device 1 reads image data of a document slip and information of a recording character string corresponding to the image data from the database 4 by controlling the communication unit 110 (Step S601). The acquisition unit 191 outputs the image data and the recording character string to the feature quantity extracting unit 192.

The feature quantity extracting unit 192 performs an OCR process for the image data and detects all the character strings in the image data and coordinates in the image data that represent ranges of the character strings (Step S602). A character string is a unit of characters composed of a plurality of characters. The feature quantity extracting unit 192 analyzes a range of one unit in accordance with a spacing from other characters and the like, extracts one or a plurality of characters included in the range as a character string, and detects coordinates representing the range of the character string in the image data. Characters included as a character string may include symbols such as an ideogram and a photogram, a mark, an icon image, and the like.

The feature quantity extracting unit 192 compares a character string extracted from image data through an OCR process with a recording character string read from the database 4 together with the image data. The feature quantity extracting unit 192 identifies a character string in image data matching character information of a recording character string among character strings extracted from the image data through the OCR process, attributes of characters included in the character string, and coordinates of the range thereof (Step S603).

The attributes of characters (character attributes) described here are information represented using a number, letters, a Japanese character, a Chinese character, the number of characters, the height of a character, a font, and the like. The coordinates of the range of a character string are coordinates representing positions of the character string in a document slip. For example, the coordinates of the range of a character string may be information that represents coordinates of a first character included in the character string, coordinates of a last character, and the like. Hereinafter, attributes of characters included in a character string and coordinates of the range of the character string will be collectively referred to as attributes of the character string or character string attributes.

Character information described here may be only a character string or may include character string attributes. In other words, the feature quantity extracting unit 192 may determine whether or not a recording character string and a character string in the image data are the same as a character string. Alternatively, the feature quantity extracting unit 192 may determine an identity of character string attributes in addition to the identity of characters.

Next, the feature quantity extracting unit 192 determines whether or not all the recording character strings in the document slip have been uniquely identified (Step S604).

In a case in which it is determined that they have not been uniquely identified (Step S604: No), the feature quantity extracting unit 192 causes the display unit 120 to display an image in which a range of each candidate for the recording character string is represented using a frame and identifies a recording character string to be a character string selected by the operator (Step S605). The candidates for a recording character string described here are character strings associated with recording character strings determined not to be uniquely identified in Step S604 among character strings of which character information matches the character information of the recording character string in Step S603. In a case in which the feature quantity extracting unit 192 determines that character information of each of a plurality of character strings in a document slip matches the character information of one recording character string, the plurality of character strings become candidates for the recording information. When an operator selects any one of the plurality of character strings, a recording character string is uniquely identified.

FIG. 7 is a diagram illustrating an example of an image in which a range of each candidate for a recording character string is represented using a frame. FIG. 7 illustrates an example of a case in which each recording character string "1" is not identified on image data of a document slip. The display unit 120 displays a checking screen in which each character string "1" is enclosed by a rectangular frame on image data of a document slip in accordance with the control of the feature quantity extracting unit 192. These character strings "1" enclosed by the rectangular frames correspond to examples of candidates for a recording character string.

When an operator selects one of the character strings enclosed by the rectangular frames on the checking screen, for example, by performing a touch operation, a mouse click, or the like, this recording character string is uniquely determined. By uniquely determining a recording character string, the feature quantity extracting unit 192 can extract a first feature quantity of the recording character string.

The feature quantity extracting unit 192 extracts a feature quantity that is common to document slips of the same format and is a feature quantity for each recording character string using character string attributes extracted for each document slip and for each recording character string (Step S606).

More specifically, the feature quantity extracting unit 192, for each recording character string, analyzes character string attributes of the recording character string in a plurality of document slips and extracts one feature quantity for one recording character string.

Also in a case in which it is determined that the feature quantity extracting unit 192 has uniquely identified all the recording character strings inside the document slip in Step S604 (Step S604: Yes), the process is caused to proceed to Step S606.

A method used by the feature quantity extracting unit 192 for extracting a feature quantity that is common to document slips of the same format and is a feature quantity for each recording character string is not limited to a specific method. For example, the feature quantity extracting unit 192 may acquire a maximum frequency (Mode) of each of items such as the coordinates of a first character, the coordinates of a last character, a type of character, a height of a character, a type of font, and the like for a plurality of character string attributes acquired from a plurality of document slips. In addition, the feature quantity extracting unit 192 may acquire an average or a median of each item for attributes represented using numerical values such as the coordinates of a first character, the coordinates of a last character, the height of a character, a distance between characters, and the like. Furthermore, the feature quantity extracting unit 192 may use, for an item represented using a numerical value, a feature quantity having a range or a feature quantity represented by a plurality of numerical values by, for example, setting its maximum value or minimum value to a feature quantity. In addition, the feature quantity extracting unit 192 may acquire a feature quantity by changing an attribute other than a numerical value such as a type of character or a type of font into a numerical value. Furthermore, the feature quantity extracting unit 192 may extract a feature quantity using a known machine learning algorithm.

In a case in which a plurality of numerical values are acquired for one format and one recording character string of a document slip, the feature quantity extracting unit 192 may change the plurality of numerical values into vectors and extract a feature quantity of one vector.

A feature quantity, which is common to document slips of the same format and is a feature quantity for each recording character string, extracted by the feature quantity extracting unit 192 will be referred to as a first feature quantity. The feature quantity extracting unit 192 extracts, by using a plurality of document slips of the same format, a first feature quantity of each recording character string of the format. The first feature quantity is a feature quantity used for extracting a recording character string. The first feature quantity may include one of information representing attributes of a character and coordinates representing a range of a character string or a combination thereof.

The feature quantity extracting unit 192 records a first feature quantity acquired for each recording character string in the database 4 in association with an identifier of the format of the document slip (Step S607).

For example, the feature quantity extracting unit 192 records each first feature quantity representing character attributes, coordinates representing the range of a character string, and the like of each of the date 51, the ordering destination 52, the product name 53, the quantity 54, and the amount of money 55 that are recording character strings included in the format of the document slip 5 in FIG. 4 in the database 4 linked to a format identifier of the document slip 5.

After Step S607, the image processing device 1 ends the process in FIG. 6.

In accordance with the processes described above, the image processing device 1 can extract information (the first feature quantity) used for reducing an operator's effort for recording recording character strings and accumulate the information in the database 4. In this way, the image processing device 1 can receive an input of image data of a new document slip and record recording character strings included in the document slip in the database 4 automatically. The processes will be described with reference to FIG. 8.

Figure 8:
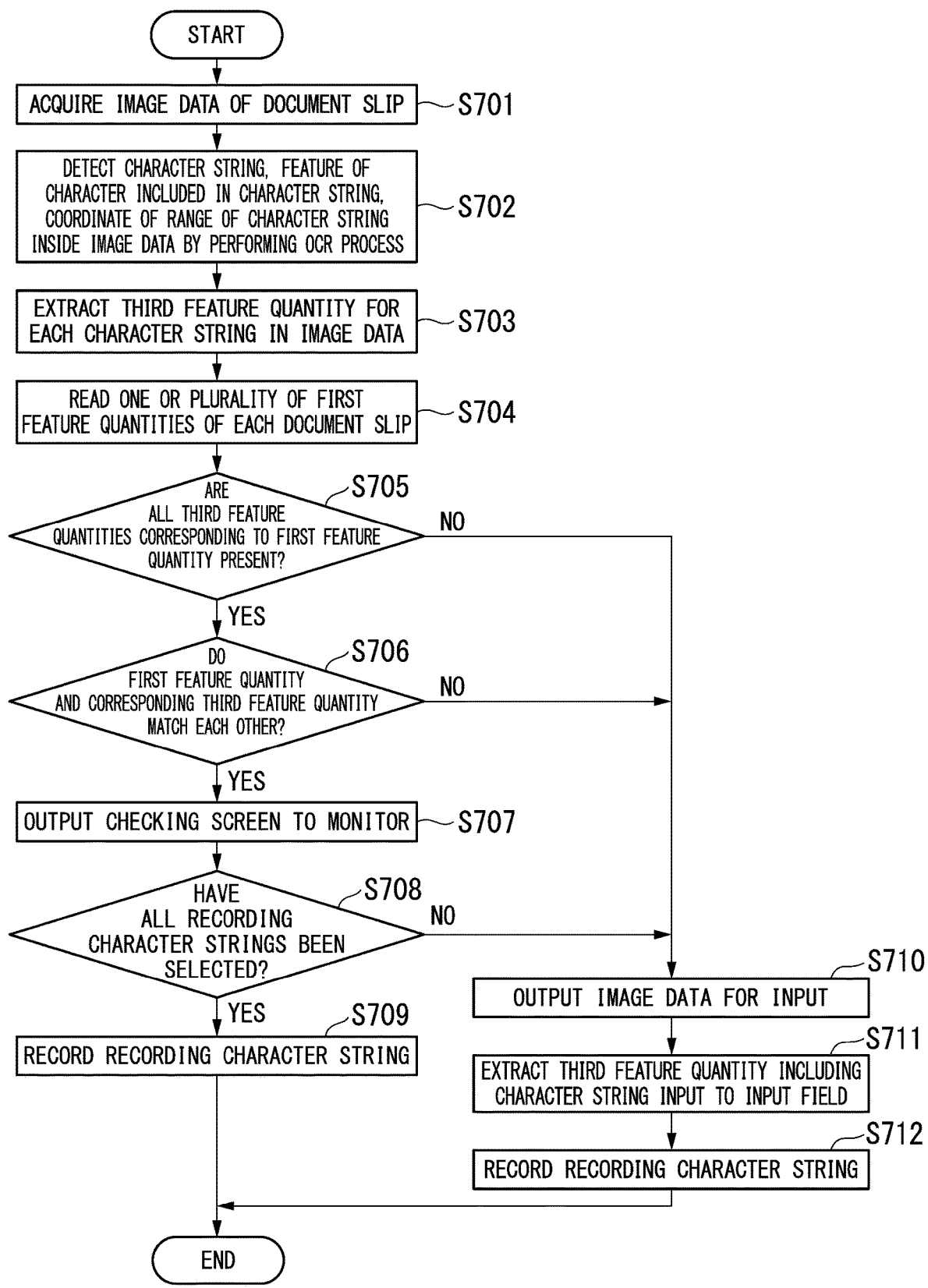
FIG. 8 is a second diagram illustrating the processing flow of the image processing device according to the first example embodiment.

FIG. 8 is a second diagram illustrating the processing flow of the image processing device according to the first example embodiment. FIG. 8 illustrates an example of the processing sequence in which the image processing device 1 extracts a recording character string from image data that has been newly input.

An operator performs an operation of causing the image reading device 2 to read a new document slip. In accordance with this, the image reading device 2 generates image data of the document slip and outputs (transmits) it to the image processing device 1. The acquisition unit 191 of the image processing device 1 acquires the image data from reception data of the communication unit 110 (Step S701). The acquisition unit 191 outputs the image data to the feature quantity extracting unit 192. By performing an OCR process for image data, the feature quantity extracting unit 192 detects a character string, features of characters (character attributes) included in the character string, and coordinates of the range of the character string within the image data for each character string (Step S702). The feature quantity extracting unit 192 extracts a third feature quantity acquired by changing the detected information into a feature quantity for each character string in the image data (Step S703). In other words, the third feature quantity is information that represents a feature of a character string included in a document slip of image data that has been newly read. Thereafter, the feature quantity extracting unit 192 reads a first feature quantity for each recording character string from the database 4 (Step S704). The feature quantity extracting unit 192 outputs the third feature quantity and the first feature quantity to the recording unit 193.

The recording unit 193 acquires a third feature quantity of each character string in image data and a first feature quantity of each recording character string. The recording unit 193 determines whether or not a third feature quantity can be uniquely associated with each first feature quantity (Step S705). For example, a first feature quantity is configured to include coordinates representing the range of a character string, and the recording unit 193 determines whether or not all the third feature quantities having coordinates corresponding to coordinates represented by first feature quantities are present using the coordinates representing the range of the character string included in each first feature quantity.

In a case in which all the third feature quantities having coordinates corresponding to the coordinates of the first feature quantities are present (Step S705: Yes), a description of characters is present in all the description items written in a document slip corresponding to the recording character string. On the other hand, in a case in which all the third feature quantities having coordinates corresponding to the coordinates of the first feature quantities are not present, it is a state in which a description of characters is not present in any description item inside the document slip.

In the case of Yes in Step S705, the recording unit 193 determines whether or not character attributes included in the first feature quantity and character attributes included in the third feature quantity corresponding to the first feature quantity match each other (Step S706).

In a case in which a determination result of Step S706 is Yes, and the character attributes match each other (Step S706: Yes), the recording unit 193 generates a checking screen in which a rectangular frame is displayed in the range of a recording character string based on coordinates represented by one or a plurality of third feature quantities in image data that is currently being processed. The recording unit 193 outputs the checking screen to a monitor (Step S707). An operator can check a recording character string to be recorded by the image processing device 1 by checking a rectangular area displayed on this checking screen. In this way, the operator can check whether or not the recording character strings are sufficient. In other words, an operator can check whether all the recording character strings have been selected (whether the recording character strings are enclosed by rectangular frames on the checking screen).

An icon image of a button OK or NG is displayed on the checking screen. By selecting the button OK among icon images of the buttons, an operator can instruct that there is no insufficiency in the selection of recording character strings. On the other hand, by selecting the button NG among the icon images of the buttons, an operator can instruct that there is insufficiency in the selection of recording character strings.

The reason for outputting the checking screen to the monitor will be described with reference to FIG. 4. In FIG. 4, among recording character strings, six products names 53 are entered. In a case in which a maximum of six product names 53 have been entered in past document slips, one to six product names 53 are automatically determined as recording character strings in a new document form. Thus, for example, in a case in which seven product names 53 are written in a new slip, for the parts of first to sixth product names, Yes is acquired in both Steps S705 and S706, and thus, the image processing device 1 ends the process without recording the seventh character string.

In order to enhance such an event, before recording a recording character string in Step S707, the image processing device 1 checks whether recording may be ended for an operator by displaying a checking screen.

In accordance with an operator pressing an icon image of a button, the recording unit 193 determines whether or not all the recording character strings have been selected (Step S708). In a case in which all the recording character strings have been selected (Step S708: Yes), the recording unit 193 records the recording character strings in a recording table in association with identification information of the document slip (Step S709).

For example, it is assumed that a third feature quantity a3, a third feature quantity b3, a third feature quantity c3, and a third feature quantity d3 are acquired from image data of the document slip. Also, it is assumed that the third feature quantity a3 matches the first feature quantity a1 recorded in the database in advance, the third feature quantity b3 matches the first feature quantity b1, the third feature quantity c3 matches the first feature quantity c1, and the third feature quantity d3 matches the first feature quantity d1. In this case, the recording unit 193 records character strings that respectively correspond to the third feature quantity a3, the third feature quantity b3, the third feature quantity c3, and the third feature quantity d3 in the recording table of the document slip as recording character strings. A character string corresponding to a third feature quantity described here is a character string of an extraction source of the third feature quantity.

After Step S709, the image processing device 1 ends the process illustrated in FIG. 8.

In the case of No in Step S705 described above, in the case of No in Step S706, or in the case of No in Step S708, the recording unit 193 performs a process of a case in which a third feature quantity having coordinates corresponding to the coordinates represented by the first feature quantity is not present. More specifically, the recording unit 193 generates input image data of a slip image (an image of a document slip) in which an input field is disposed in the range of coordinates of a first feature quantity in which a third feature quantity of corresponding coordinates is not present inside the image data and outputs it to the monitor (Step S710). The input image data may be data that is written in a markup language such as HTML or XML. While viewing this input image data, an operator inputs a recording character string into an input field inside the input image data displayed in the monitor by operating an input device such as a keyboard or the like of the image processing device 1. A save button is displayed in the input image data, and, when a pressing operation for the save button is performed, the recording unit 193 extracts a third feature quantity including a character string that is newly input into the input field of the input image data in addition to the third feature quantity that has been acquired for the document slip in advance (Step S711).

The recording unit 193 records an identifier of slip image data and a recording character string in the database 4 in association with each other (Step S712). More specifically, the recording unit 193 sets an input character string as a recording character string for the character string input into the input field in Step S711 and sets a character string identified through a comparison between a first feature quantity and a third feature quantity as a recording character string for the other recording character strings. Then, the recording unit 193 records the recording character string and the identifier of the slip image data in the database 4 in association with each other.

After Step S712, the image processing device 1 ends the process in FIG. 8.

The image processing device 1 may update the first feature quantity in the process in FIG. 8. For example, after Step S711, the image processing device 1 may be configured to perform the processing flow illustrated in FIG. 6 again. Alternatively, the image processing device 1 may update the first feature quantity without performing the process again only for data that has been processed in FIG. 6 by performing additional learning after Step S711. In addition, also in the case of Yes in Step S708, the image processing device 1 may update the first feature quantity by performing the processing flow in FIG. 6 again or performing additional learning.

By the image processing device 1 updating the first feature quantity in the processes in FIG. 8, it is expected that the accuracy of the first feature quantity is improved by increasing the number of pieces of sample data, and, the accuracy with which the image processing device 1 extracts a recording character string is be improved. In addition, in a case in which a recording character string is added in the process in FIG. 8, it is expected that the image processing device 1 can extract also the recording character string that has been newly added from image data, and operator's effort for inputting a character string is reduced.

According to the processes illustrated in FIG. 8, the image processing device 1 can automatically record a recording character string in image data of a document slip that has been newly input using image data and recording character strings of document slips that have been recorded by an operator in advance. Therefore, the image processing device 1 can reduce operator's effort for recording a recording character string of a document slip.

In addition, also in a case in which a recording character string is not described in a document slip, the image processing device 1 outputs input image data in a case in which a description item corresponding to a recording character string to be originally described is not described. This makes it possible to find an error that a description item has not been input in a document form, and to easily record the recording character string indicated by the description item.

<Second Example Embodiment>

In a second example embodiment, a case in which an image processing device 1 handles a plurality of formats of document slips will be described.

Figure 9:
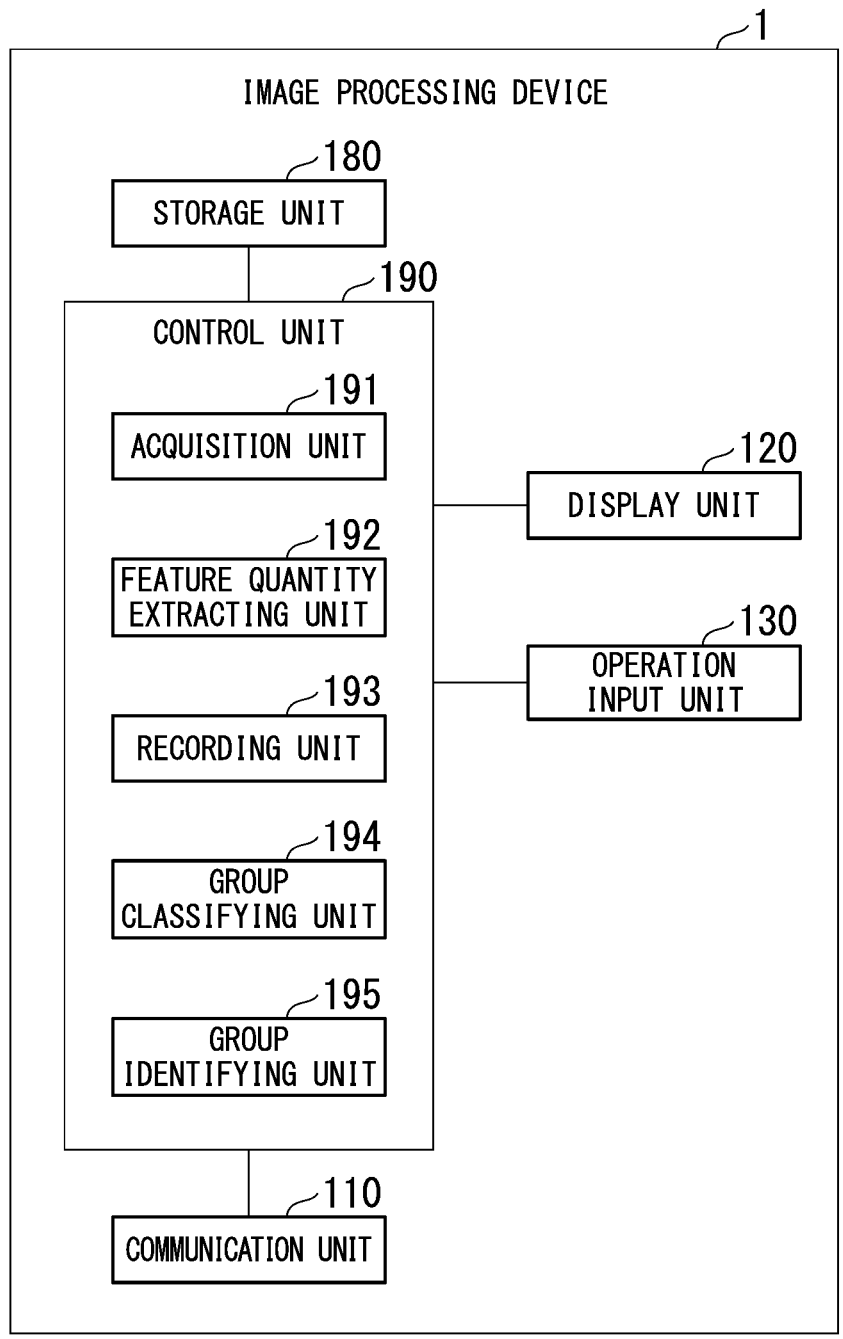
FIG. 9 is a schematic block diagram illustrating the functional configuration of an image processing device according to a second example embodiment.

FIG. 9 is a schematic block diagram illustrating the functional configuration of an image processing device according to the second example embodiment.

As illustrated in FIG. 9, the image processing device 1 according to the second example embodiment further has functions of a group classifying unit 194 and a group identifying unit 195 in addition to the functional units illustrated in FIG. 3.

Figure 10:
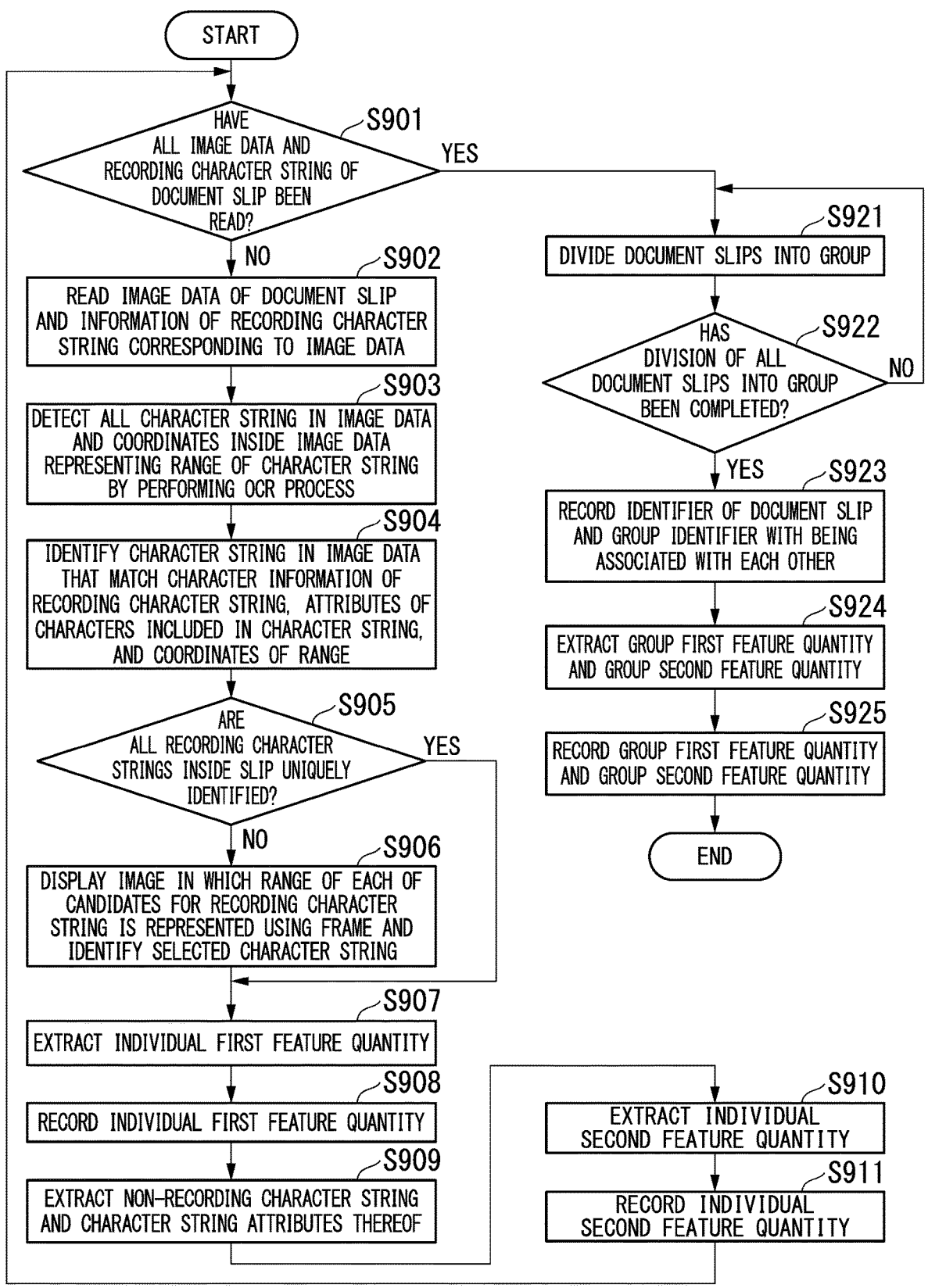
FIG. 10 is a first diagram illustrating the processing flow of the image processing device according to the second example embodiment.

FIG. 10 is a first diagram illustrating the processing flow of the image processing device according to the second example embodiment.

Next, the process flow of the image processing device 1 according to the second example embodiment will be described in order.

In a database 4, many combinations of image data of a plurality of document slips having different formats and recording character strings described in each document slip are recorded for each document slip. In such a state, an operator starts the operation of the image processing device 1 and instructs the image processing device 1 to start the process.

An acquisition unit 191 of the image processing device 1 determines whether all image data of document slips and information of recording character strings corresponding to the image data has been read from the database 4 (Step S901). In the case of No, the acquisition unit 191 reads image data of a document slip and information of recording character strings corresponding to the image data from the database 4 (Step S902). The acquisition unit 191 outputs the image data and the recording character string to a feature quantity extracting unit 192.

The feature quantity extracting unit 192 performs an OCR process for the image data and detects all the character strings in the image data and their coordinates in the image data (Step S903). A character string is a unit of characters composed of a plurality of characters. The feature quantity extracting unit 192 analyzes a range of one unit in accordance with a spacing from other characters and the like, extracts one or a plurality of characters included in the range as a character string, and detects coordinates representing the range of the character string in the image data. Characters included as a character string may include symbols such as an ideogram and a photogram, a mark, an icon image, and the like.

The feature quantity extracting unit 192 compares a character string extracted from image data through an OCR process with a recording character string read from the database 4 together with the image data. The feature quantity extracting unit 192 identifies a character string in image data matching character information of a recording character string among character strings extracted from the image data through the OCR process, attributes of characters included in the character string, and coordinates of the range (Step S904).

As described in the first example embodiment, attributes of a character are information represented using a number, an alphabet, a Japanese character, a Chinese character, the number of characters, a height of a character, a font, and the like. The coordinates of the range of a character string are coordinates representing positions of the character string in a document slip. For example, the coordinates of the range of a character string may be information that represents coordinates of a first character included in the character string, coordinates of a last character, and the like. Attributes of characters included in a character string and coordinates of the range of the character string will be collectively referred to as attributes of the character string or character string attributes.

Similar to the case of the first example embodiment, character information described here may be only a character string or may include character string attributes. In other words, the feature quantity extracting unit 192 may determine whether or not a recording character string and a character string in the image data are the same as a character string. Alternatively, the feature quantity extracting unit 192 may be determine an identity of character string attributes in addition to the identity of characters.

Next, the feature quantity extracting unit 192 determines whether or not all the recording character strings inside the document slip have been uniquely identified (Step S905).

In a case in which it is determined that they have not been uniquely identified (Step S905: No), the feature quantity extracting unit 192 causes the display unit 120 to display an image in which the range of each candidate for a recording character string is represented using a frame and identifies a character string selected by an operator as a recording character string (Step S906). As in the case of the first example embodiment, the candidates for a recording character string described here are character strings associated with a recording character string determined not to be uniquely identified in Step S905 among character strings of which character information matches the character information of the recording character string in Step S904. In a case in which the feature quantity extracting unit 192 determines that character information of each of a plurality of character strings in a document slip matches the character information of one recording character string, the plurality of character strings become candidates for the recording information.

When an operator selects any one of the plurality of character strings, a recording character string is uniquely identified.

The feature quantity extracting unit 192 extracts a feature quantity for each document slip and for each recording character string using character string attributes extracted for each document slip and for each recording character string (Step S907). More specifically, the feature quantity extracting unit 192 changes character string attributes of a character string associated with the recording character string in Step S904 into a feature quantity. In the second example embodiment, since a plurality of types of formats are targeted, at a time point of Step S907 in which document slips have not been divided into groups for each format, different from the case of Step S606 illustrated in FIG. 6, a first feature quantity cannot be directly extracted. Thus, as preparation of extraction of a first feature quantity for each group, the feature quantity extracting unit 192 extracts a feature quantity for each document slip and for each recording character string. The feature quantity for each document slip and for each recording character string will be referred to as an individual first feature quantity.

In a case in which the feature quantity extracting unit 192 determines that all the recording character strings inside the document slip are uniquely identified in Step S905 (Step S905: Yes), the process also proceeds to Step S907.

The feature quantity extracting unit 192 records an acquired individual first feature quantity in the database 4 in association with an identifier of the document slip and an identifier of the recording character string (Step S908). As the identifier of the recording character string, for example, coordinate values representing the position of the recording character string can be used.

For example, the feature quantity extracting unit 192 records each individual first feature quantity representing character attributes, coordinates representing the range of a character string, and the like of each of the date 51, the ordering destination 52, the product name 53, the quantity 54, and the amount of money 55 that are recording character strings included in the format of the document slip 5 in FIG. 4 in the database 4 for each document slip and for each recording character string in association with the format identifier of the document slip 5.

In addition, the feature quantity extracting unit 192 extracts a non-recording character string in the image data that does not match character information included in the recording character string and character string attributes of the non-recording character string (Step S909). As described above, the non-recording character string is a character string that is not recorded by an operator, in other words, a character string other than the recording character string. The character string attributes may include one or both of information representing attributes of characters included in the character string and information representing coordinates of the range of the character string.

The feature quantity extracting unit 192 extracts a feature quantity for each document slip and for each non-recording character string using character string attributes extracted for each document slip and for each non-recording character string (Step S910).

More specifically, the feature quantity extracting unit 192 changes attributes of a character string (character string attributes) into a feature quantity for each character string not associated with any recording character string in Step S904. Similar to the case of the first feature quantity, at a time point of Step S910 in which document slips have not been divided into groups for each format, a feature quantity that is common to document slips of the same format cannot be generated. Thus, as preparation of extraction of a second feature quantity for each group, the feature quantity extracting unit 192 extracts a feature quantity for each document slip and for each non-recording character string. The feature quantity for each document slip and for each non-recording character string will be referred to as an individual second feature quantity.

The feature quantity extracting unit 192 may generate an individual second feature quantity in which a plurality of non-recording character strings are gathered for each document slip. For example, the feature quantity extracting unit 192 may generate one individual second feature quantity for one document slip.

The feature quantity extracting unit 192 records the acquired individual second feature quantity in the database 4 in association with an identifier of the document slip and an identifier of the non-recording character string (Step S911). As the identifier of the non-recording character string, for example, coordinate values representing the position of the non-recording character string can be used.

For example, the feature quantity extracting unit 192 records individual second feature quantities representing a name 501 of an ordering person, an emblem image of the ordering person, a title 503 of the document slip, a greeting phrase 504, and the like that are non-recording character strings included in the format of the document slip 5 illustrated in FIG. 4 in the database 4 in association with the identifier of the document slip 5 and the identifier of the non-recording character string.

In the database 4, for each of a plurality of formats of document slips, image data of document slips of the format and information of a recording character string corresponding to the image data is recorded. The acquisition unit 191 of the image processing device 1 repeats the processes of Steps S901 to S911 until image data and information of recording character strings for all the document slips is read.

In Step S901, in a case in which the acquisition unit 191 determines that all image data of document slips and information of recording character strings corresponding to the image data has read from the database 4 (Step S901: Yes), the group classifying unit 194 divides the document slips into groups (Step S921). The group classifying unit 194 divides document slips into groups on the basis of the individual second feature quantities included in the image data of the document slips. For example, the group classifying unit 194 divides document slips into groups on the basis of a degree of matching between non-recording character strings, a degree of matching between emblem images, a degree of matching between coordinate ranges of non-recording character strings, and the like represented by the individual second feature quantities. The group classifying unit 194 determines group identifiers of the document slips in this group division process. The group classifying unit 194 determines whether group division has been completed for all the document slips (Step S922).

In a case in which the group division has not been completed for all the document slips, the group classifying unit 194 repeats the process of Step S921. More specifically, in Step S922, in a case in which the group classifying unit 194 determines that there is a document slip for which the group division has not been completed (Step S922: No), the process returns to Step S921.

In a case in which the group division for all the document slips has been completed (Step S922: Yes), the group classifying unit 194 records an identifier of each document slip and a group identifier assigned to the document slip in a group table (recording table) of the database 4 in association with each other (Step S923).

The feature quantity extracting unit 192 reads an individual first feature quantity and an individual second feature quantity of each of one or a plurality of document slips belonging to a certain group from the database 4 and extracts each group first feature quantity and each group second feature quantity corresponding to the individual first feature quantity and the individual second feature quantity of each document slip belonging to the group (Step S924). Each group first feature quantity may be a value such as an average of individual first feature quantities of document slips belonging to a group. Similarly, each group second feature quantity may be a value such as an average of individual second feature quantities of document slips belonging to a group. Each group first feature quantity and each group second feature quantity may not be respectively an average of the individual first feature quantities and an average of the individual second feature quantities, and each group first feature quantity and each group second feature quantity may be extracted using any technique as long as the feature quantities are feature quantities that are calculated such that recording character strings and non-recording character strings of one or a plurality of document slips belonging to a group can be identified using a predetermined statistical process or a technique such as machine learning.

For example, the feature quantity extracting unit 192 may (directly) generate group first feature quantities by extracting a character string attribute for each recording character string from a plurality of document slips belonging to the same group in Step S924. In such a case, the feature quantity extracting unit 192 skips the extraction and recording of the individual first feature quantities in Steps S907 and S908 (does not perform a particular process).

On the other hand, the individual second feature quantity is extracted by the feature quantity extracting unit 192 in Step S910 such that it can be used for group division in Step S921. Here, in Step 921, the group classifying unit 194 may perform group division of document slips using non-recording character strings without using the individual second feature quantities. In such a case, the feature quantity extracting unit 192 may (directly) extract group second feature quantities from character string attributes of non-recording character strings of a plurality of document slips belonging to the same group in Step S924. In such a case, the feature quantity extracting unit 192 does not perform any particular process in Steps S909 to S911.

The feature quantity extracting unit 192 calculates each group first feature quantity and each group second feature quantity for each group and records them in the database 4 in association with an identifier of the group (Step S925).

After Step S925, the image processing device 1 ends the process in FIG. 10.

In accordance with the processes described above, the image processing device 1 can extract information (group first feature quantities and group second feature quantities) required for reducing operator's effort for recording recording character strings for each group of document slips and accumulate them in the database 4. In this way, the image processing device 1 can receive an input of image data of a new document slip and automatically record recording character strings included in the document slip in the database 4. The process will be described with reference to FIG. 11.

Figure 11:
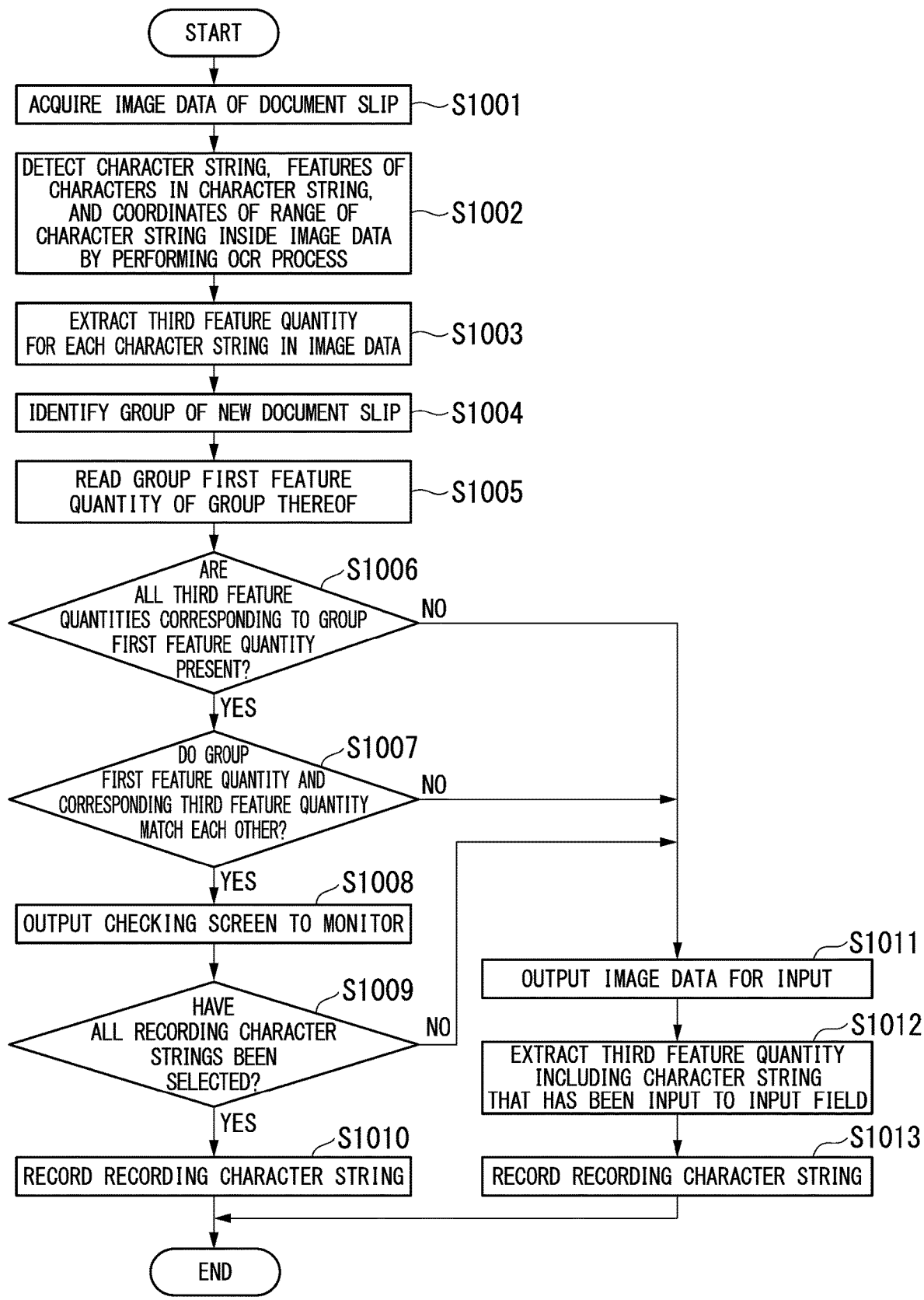
FIG. 11 is a second diagram illustrating the processing flow of the image processing device according to the second example embodiment.

FIG. 11 is a second diagram illustrating the processing flow of the image processing device according to the second example embodiment.

FIG. 11 illustrates an example of a processing sequence in which the image processing device 1 extracts a recording character string from image data that has been newly input.

An operator performs an operation of causing the image reading device 2 to read a new document slip. In accordance with this, the image reading device 2 generates image data of the document slip and outputs (transmits) it to the image processing device 1. The acquisition unit 191 of the image processing device 1 acquires image data from reception data of the communication unit 110 (Step S1001). The acquisition unit 191 outputs the image data to the feature quantity extracting unit 192. The feature quantity extracting unit 192 performs an OCR process for the image data and detects a character string, a feature of characters included in the character string (character attributes), and coordinates of the range of the character string in the image data for each character string (Step S1002). The feature quantity extracting unit 192 extracts a third feature quantity acquired by changing the detected information into a feature quantity for each character string included in the image data (Step S1003). The third feature quantity is information that represents a feature of a character string included in a document slip of image data that has been newly read.

Next, the group identifying unit 195 reads a group second feature quantity used for identifying a group of the new document slip among group second feature quantities stored by the database 4. The group second feature quantity, for example, may be a feature quantity corresponding to the emblem image 502 of the ordering person that is displayed in the image data of the document slip. The group identifying unit 195 determines whether information represented in a certain group second feature quantity can be identified from the image data of the document slip acquired in Step S1001. The group identifying unit 195 performs a similar process using a group second feature quantity for all the groups. In a case in which information matching the group second feature quantity read from the database 4 can be identified from the image data of a document slip that has been newly read, the group identifying unit 195 identifies a group having the group second feature quantity as a group of the image data of the document slip that has been newly read (Step S1004). Thereafter, the group identifying unit 195 reads one or a plurality of group first feature quantities for the group from the database 4 (Step S1005). The group identifying unit 195 outputs the third feature quantity and one or a plurality of group first feature quantities to the recording unit 193. The group first feature quantity is a feature quantity used for identifying one or a plurality of recording character strings in a document slip belonging to the group.

The recording unit 193 acquires a third feature quantity and one or a plurality of group first feature quantities of one or a plurality of character strings inside image data. The recording unit 193 determines whether all the third feature quantities having coordinates corresponding to the coordinates represented by the group first feature quantities are present using the coordinates representing the range of the character string included in each group first feature quantity (Step S1006). In a case in which all the third feature quantities having coordinates corresponding to the coordinates of the group first feature quantities are present, description of characters are present in all the description items inside the document slip corresponding to the recording character string. On the other hand, in a case in which all the third feature quantities having coordinates corresponding to the coordinates of the group first feature quantities are not present, it is a state in which a description of characters is not present in any one of description items inside the document slip.

In the case of Yes in Step S1006, the recording unit 193 determines whether or not character attributes included in the group first feature quantity and character attributes included in the corresponding third feature quantity identified based on the coordinates match each other (Step S1007).

In a case in which a determination result of Step S1007 is Yes and the character attributes match each other, the recording unit 193 generates a checking screen in which a rectangular frame is displayed in the range of a recording character string based on coordinates represented by one or a plurality of third feature quantities in image data that is currently processed. The recording unit 193 outputs the checking screen to a monitor (Step S1008). An operator can check a recording character string to be recorded by the image processing device 1 by checking a rectangular area displayed on this checking screen. In this way, the operator can check whether or not there is no insufficiency in the recording character string. In other words, an operator can check whether all the recording character strings have been selected (whether the recording character strings are enclosed by rectangular frames on the checking screen).

On the checking screen, an icon image of a button of OK or NG is displayed. By selecting the button OK among icon images of the buttons, an operator can instruct that there is no insufficiency in the selection of recording character strings. On the other hand, by selecting the button NG among the icon images of the buttons, an operator can instruct that there is insufficiency in the selection of recording character strings.

In accordance with operator's pressing of an icon image of a button, the recording unit 193 determines whether or not all the recording character strings have been selected (Step S1009). In a case in which all the recording character strings have been selected (Step S1009: Yes), the recording unit 193 records the recording character strings in a recording table in association with identification information of the document slip (Step S1010).

For example, it is assumed that a third feature quantity a3, a third feature quantity b3, a third feature quantity c3, and a third feature quantity d3 are acquired from image data of the document slip. Moreover, it is assumed that the third feature quantity a3 matches the group first feature quantity g11 recorded in the database in advance, the third feature quantity b3 matches the group first feature quantity g12, the third feature quantity c3 matches the group first feature quantity g13, and the third feature quantity d3 matches the group first feature quantity g14. In this case, the recording unit 193 records character strings that respectively correspond to the third feature quantity a3, the third feature quantity b3, the third feature quantity c3, and the third feature quantity d3 in the recording table of the document slip as recording character strings. A character string corresponding to a third feature quantity described here is a character string of an extraction source of the third feature quantity.

After Step S1010, the image processing device 1 ends the process in FIG. 11.

In the case of No in Step S1006 described above, in the case of No in Step S1007, or in the case of No in Step S1009, the recording unit 193 performs a process of a case in which a third feature quantity having coordinates corresponding to the coordinates represented by the group first feature quantity is not present. More specifically, the recording unit 193 generates input image data of a slip image (an image of a document slip) in which an input field is disposed in the range of coordinates of a group first feature quantity in which a third feature quantity of corresponding coordinates is not present inside the image data and outputs it to the monitor (Step S1011). The input image data may be data that is described in a markup language such as HTML or XML. While viewing this input image data, an operator inputs a recording character string into an input field inside the input image data displayed in the monitor by operating an input device such as a keyboard or the like of the image processing device 1. A save button is displayed in the input image data, and, when a pressing operation for the save button is performed, the recording unit 193 extracts a third feature quantity including a character string that is newly input into the input field of the input image data in addition to the third feature quantity that has been acquired for the document slip in advance (Step S1012).

The recording unit 193 records an identifier of slip image data and a recording character string in the database 4 in association with each other (Step S1013). More specifically, the recording unit 193 sets an input character string as a recording character string for the character string input into the input field in Step S711 and sets a character string identified through a comparison between a first feature quantity and a third feature quantity as a recording character string for the other recording character strings. Then, the recording unit 193 records the recording character string and the identifier of the slip image data in the database 4 in association with each other.

After Step S1013, the image processing device 1 ends the process in FIG. 11.

The image processing device 1 may update the first feature quantity in the process in FIG. 11. For example, after Step S1012, the image processing device 1 may perform the processing flow in FIG. 6 again. Alternatively, the image processing device 1 may update the first feature quantity without performing the process again only for data that has been processed in FIG. 6 by performing additional learning after Step S1012. In addition, also in the case of Yes in Step S1009, the image processing device 1 may update the first feature quantity by performing the processing flow in FIG. 6 again or performing additional learning.

By the image processing device 1 updating the first feature quantity in the processes in FIG. 11, it is expected that the accuracy of the first feature quantity is improved by increasing the number of pieces of sample data, and, the accuracy with which the image processing device 1 extracts a recording character string is improved. In addition, in a case in which a recording character string is added in the process in FIG. 11, it is expected that the image processing device 1 can extract also the recording character string that has been newly added from image data, and operator's effort for inputting a character string is reduced.

According to the process illustrated in FIG. 11, the image processing device 1 can automatically record recording character strings in the image data of the document slip regardless of the type of document slip that has been newly input using image data and recording character strings of the document slip of each of a plurality of formats that have been recorded in advance by an operator. Therefore, the image processing device 1 can reduce operator's effort for recording a recording character string of the document slip.

In addition, also in a case in which a recording character string is not described in a document slip, the image processing device 1 outputs input image data in a case in which a description item corresponding to a recording character string to be originally described is not described. In this way, an error of not inputting a description item to be described in a document slip is found, and a recording character string represented by the description item can be easily recorded.

<Third Example Embodiment>

As another example of the process of the image processing device 1, an operator may register a group of document slips in the image processing device 1 in advance. For example, when image data of document slips is registered in the past, an operator inputs a group identifier in accordance with a type of document slip and registers it in the database 4 in association with the image data of the document slip. In this way, there is no mixing of slips of different type inside the same group due to a processing error of the image processing device 1 or the like, and a first feature quantity having a high accuracy can be extracted. In addition, in this case, although a group of a document slip is input by an operator at the time of registration, as in Step S1004, for a new slip, the group is identified using the second feature quantity.

<Fourth Example Embodiment>

As another example of the process of an image processing device 1, the image processing device 1 may not only divide document slips into groups using second feature quantities but also divide document slips into groups using first feature quantities and using first feature quantities together with the second feature quantities. Although the first feature quantities are feature quantities of recording character strings, in the case of document slips of the same type, coordinates of recording character strings and character attributes thereof are assumed to be the same and slips can be divided into groups using the first feature quantities. When initial group division is performed by an operator as illustrated in a fourth example embodiment and new document slips are divided into groups using first feature quantities using the process of Step S1004, recording character strings can be read with a high accuracy in an OCR process.

In this case, an acquisition unit 191 acquires a plurality of pieces of slip image data and recording character strings that are recording targets among character strings included in the slip image data. Then, a group classifying unit 194 divides the slip image data into groups on the basis of the first feature quantities. Then, a feature quantity extracting unit 192 extracts recording character strings using first feature quantities corresponding to the slip image data included in a group.

<Fifth Example Embodiment>

In the second example embodiment, a group of a new slip is identified on the basis of a second feature quantity in Step S1004. However, as another processing form, an image processing device 1, without performing the process of identifying a group, performs identification for each group of all the groups set by an operator, read first feature quantities and count the number of first feature quantities matching the third feature quantity. In the case of a correct group, since the first feature quantities is expected to match the third feature quantity the most, the image processing device 1 records character strings included in the third feature quantities of a specific group in which the number of matches is the most in Step S1008. In this way, recording character strings can be recorded even without identifying a group.

In this case, the acquisition unit 191 acquires a plurality of pieces of slip image data and recording character strings that are recording targets among character strings included in the slip image data. Then, the feature quantity extracting unit 192 extracts first feature quantities representing features of the recording character strings or second feature quantities representing recognition information other than the recording character strings on the basis of a result of the recognition process of the slip image data acquired by the acquisition unit 191. The feature quantity extracting unit 192 extracts recording character strings using first feature quantities corresponding to the slip image data included in a predetermined group set in advance.

As described above, the feature quantity extracting unit 192 identifies a character string designated as a recording character string among character strings acquired as a result of character recognition of a document image. In a case in which the feature quantity extracting unit 192 identifies a plurality of candidates for a recording character string, the display unit 120 outputs a checking screen representing the positions of the plurality of candidates. The feature quantity extracting unit 192 extracts a feature quantity of a recording character string at a position identified by a user on the checking screen.

In this way, in the image processing device 1, also in a case in which a recording character string cannot be uniquely identified, a feature quantity can be extracted by uniquely identifying a recording character string through presentation of candidates and identifying performed by an operator (user). From this point, according to the image processing device 1, an operator performing checking and correcting a result of character recognition can be supported for a checking and correcting operation even in a case in which a format of a character recognition target is not known in advance without being limited to the format of a table form.

In addition, by the image processing device 1 presenting a checking screen representing the positions of candidates for a recording character string to a user, an operator can relatively easily perceive the positions of the candidates for the recording character string by referring to the presented positions.

In addition, the display unit 120 outputs a checking screen that represents the positions of the plurality of candidates using displays identifying character strings on a document image.

By the display unit 120 showing candidates for a recording character string to an operator using a direct display in which character strings are identified on a document image, the operator can relatively easily perceive the positions of the candidates of the recording character string. According to the image processing device 1, the burden of an operator becomes small from this point.

In addition, the feature quantity extracting unit 192 extracts a feature quantity using, as a recording character string, a character string identified in accordance with a user operation on the document image performing a display for identifying character strings.

In this way, the operator can identify a recording character string by performing a simple operation of selecting one of character strings represented on the document image. According to the image processing device 1, the burden of an operator becomes small from this point.

In addition, the recording unit 193 extracts a recording character string from a result of character recognition of a new document image using feature quantities of recording character strings extracted by the feature quantity extracting unit 192.

In this way, according to the image processing device 1, a recording character string can be automatically extracted from a result of character recognition of a new document image. From this point, according to the image processing device 1, a checking and correcting operation can be supported.

Particularly, according to the image processing device 1, even in a case in which a format of a character recognition target is unknown in advance, feature quantities of recording character strings can be extracted, and a recording character string can be automatically extracted from a result of character recognition of a new document image using the extracted feature quantities. From this point, according to the image processing device 1, an operator performing checking and correcting a result of character recognition can be supported for a checking and correcting operation even in a case in which a format of a character recognition target is unknown in advance and without being limited to the format of a table form.

In addition, according to the image processing device 1, even in a case in which the feature quantity extracting unit 192 cannot uniquely identify a recording character string automatically, a feature quantity of the recording character string can be extracted by receiving identification from an operator. From this point, according to the image processing device 1, learning for automatically extracting a recording character string from a result of character recognition of a new document image can be accelerated. In accordance with this, it is expected that the image processing device 1 is able to automatically extract a recording character string from a result of character recognition of a new document image at an earlier time period.

Next, the configuration of an example embodiment of the present invention will be described with reference to FIG. 12.

Figure 12:
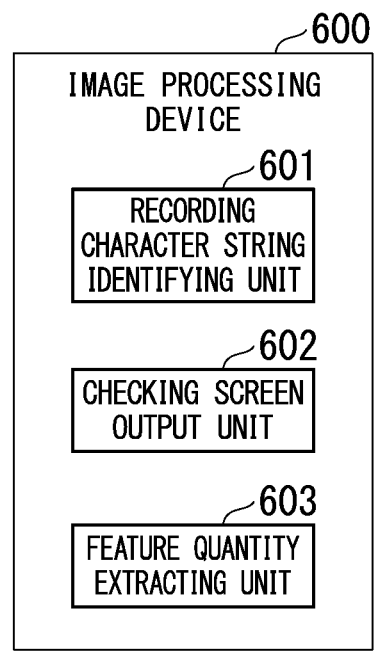
FIG. 12 is a diagram illustrating an example of the configuration of an image processing device according to an example embodiment.

FIG. 12 is a diagram illustrating an example of the configuration of the image processing device according to the example embodiment. The image processing device 600 illustrated in FIG. 12 includes a recording character string identifying unit (identifying unit) 601, a checking screen output unit (output unit) 602, and a feature quantity extracting unit (extraction unit) 603.

In such a configuration, the recording character string identifying unit 601 identifies a character string designated as a recording character string among character strings that are acquired as a result of character recognition of a document image. In a case in which the recording character string identifying unit 601 identifies a plurality of candidates for a recording character string, the checking screen output unit 602 outputs a checking screen that represents the positions of the plurality of candidates. The feature quantity extracting unit 603 extracts a feature quantity of a recording character string at a position identified by the user on the checking screen.

In this way, in the image processing device 600, also in a case in which a recording character string cannot be uniquely identified, a feature quantity can be extracted by uniquely identifying a recording character string through presentation of candidates and identifying performed by an operator (user). From this point, according to the image processing device 600, an operator performing checking and correcting a result of character recognition can be supported for a checking and correcting operation even in a case in which a format of a character recognition target is not known in advance without being limited to the format of a table form.

In addition, by the image processing device 600 presenting a checking screen representing the positions of candidates for a recording character string to a user, an operator can relatively easily perceive the positions of the candidates for the recording character string by referring to the presented positions.

Each device described above includes a computer system therein. A program causing each device to perform each process described above is stored on a computer-readable recording medium of the device, and the process described above is performed by the computer of each device reading and executing this program. The computer-readable recording medium described here represents a magnetic disk, a magneto-optical disk, a CD-ROM, a DVD-ROM, a semiconductor memory, or the like.

In addition, this computer program may be distributed to a computer through a communication line, and the computer that has received the distribution may execute the program.

The program described above may be used for realizing a part of the functions described above. In addition, the program described above may be a program realizing the functions described above by being combined with a program recorded in the computer system in advance, a so-called a differential file (differential program).

As above, although the example embodiments of the present invention has been described in detail with reference to the drawings, a specific configuration is not limited to the example embodiments, and a design and the like in a range not departing from the concept of the present invention are included therein.

INDUSTRIAL APPLICABILITY

The present invention may be applied to an image processing device, an image processing method, and a recording medium.

REFERENCE SYMBOLS

1 Image processing device
2 Image reading device
3 Recording device
4 Database
110 Communication unit
120 Display unit
130 Operation input unit
180 Storage unit
190 Control unit
191 Acquisition unit
192 Feature quantity extracting unit
193 Recording unit

The invention claimed is:

1. An image processing device comprising:
a memory configured to store instructions;
a processor configured to execute the instructions to:
identify a plurality of character strings which match one specific character string, among a plurality of character strings acquired by recognizing characters included in a document image;
cause a checking screen to be output, the checking screen representing positions of the identified plurality of character strings; and
extract a feature quantity of a character string corresponding to a position selected from the positions of the identified plurality of character strings by a user via the checking screen.

2. The image processing device according to claim 1, wherein the checking screen represents the positions of the plurality of identified character strings by displaying the document image to which a display for identifying the plurality of identified character strings is added.

3. The image processing device according to claim 2, wherein extracting the feature quantity comprises extracting the feature quantity of the character string corresponding to the position selected by the user via the document image to which the display for identifying the plurality of identified character strings is added.

4. The image processing device according to claim 1, wherein the processor is configured to execute the instructions to: extract, by using the extracted feature quantity, a character string to be recorded from a plurality of character strings acquired by recognizing characters included in a new document image.

5. An image processing method comprising:
identifying a plurality of character strings which match one specific character string, among a plurality of character strings acquired by recognizing characters included in a document image;
outputting a checking screen that represents positions of the identified plurality of character strings; and
extracting a feature quantity of a character string corresponding to a position selected from the position of the identified plurality of character strings by a user via the checking screen.

6. A non-transitory computer-readable recording medium storing a program causing a computer to execute:
identifying a plurality of character strings which match one specific character string, among a plurality of character strings acquired by recognizing characters included in a document image;
outputting a checking screen that represents positions of the identified plurality of character strings; and
extracting a feature quantity of a character string corresponding to a position selected from the positions of the identified plurality of character strings by a user via the checking screen.

* * * * *